US010499293B2

(12) United States Patent
Yang et al.

(10) Patent No.: US 10,499,293 B2
(45) Date of Patent: Dec. 3, 2019

(54) HANDOVER IN HIGH SPEED NETWORKS

(71) Applicant: QUALCOMM Incorporated, San Diego, CA (US)

(72) Inventors: Ming Yang, San Diego, CA (US); Tom Chin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/639,427

(22) Filed: Jun. 30, 2017

(65) Prior Publication Data
US 2018/0049078 A1 Feb. 15, 2018

Related U.S. Application Data

(60) Provisional application No. 62/374,996, filed on Aug. 15, 2016.

(51) Int. Cl.
*H04W 4/02* (2018.01)
*H04W 4/42* (2018.01)
(Continued)

(52) U.S. Cl.
CPC ....... *H04W 36/0083* (2013.01); *H04W 8/245* (2013.01); *H04W 24/10* (2013.01);
(Continued)

(58) Field of Classification Search
CPC ....... H04W 4/02–90; H04W 8/005–30; H04W 24/02–10; H04W 28/02–26;
(Continued)

(56) References Cited

U.S. PATENT DOCUMENTS 8,559,298 B2 10/2013 Catovic et al.
9,031,564 B2 5/2015 Teyeb et al.
(Continued)

FOREIGN PATENT DOCUMENTS

| EP | 2187671 A1 * | 5/2010 | ........ H04W 36/0094 |
| EP | 2661125 A1 * | 11/2013 | ............ H04W 36/32 |
| WO | WO-2016137395 A1 * | 9/2016 | ........ H04W 36/0055 |

OTHER PUBLICATIONS

International Search Report and Written Opinion—PCT/US2017/040609—ISA/EPO—dated Oct. 12, 2017.
(Continued)

*Primary Examiner* — Timothy J Weidner
(74) *Attorney, Agent, or Firm* — Holland & Hart LLP

(57) ABSTRACT

Methods, systems, and devices for wireless communication are described. A user equipment (UE) may detect a high speed mobility condition and a directionality of movement based on signal measurements, such as location or Doppler measurements. The UE may adjust a measurement reporting process (e.g., a time-to-trigger (TTT) parameter, a signal quality metric, a measurement reporting delay, etc.) based on the high speed mobility condition and the directionality of movement. If the UE detects the high speed mobility condition, the UE may add the physical cell identifier (PCI) of the serving cell to a list of recent serving cells. If a neighboring cell is also on the list of recent serving cells, the UE may adjust a measurement reporting process, which may affect whether the UE is directed to perform handover to the neighboring cell based on whether the neighboring cell is on the list of recent serving cells or not.

32 Claims, 10 Drawing Sheets

(51) Int. Cl.
*H04W 8/24* (2009.01)
*H04W 24/10* (2009.01)
*H04W 36/00* (2009.01)
*H04W 36/08* (2009.01)
*H04W 36/32* (2009.01)
*H04W 36/36* (2009.01)
*H04W 48/16* (2009.01)
*H04W 48/20* (2009.01)
*H04W 64/00* (2009.01)
*H04W 36/30* (2009.01)

(52) U.S. Cl.
CPC . *H04W 36/0088* (2013.01); *H04W 36/00835* (2018.08); *H04W 36/08* (2013.01); *H04W 36/30* (2013.01); *H04W 36/32* (2013.01); *H04W 36/36* (2013.01); *H04W 48/16* (2013.01); *H04W 48/20* (2013.01); *H04W 64/006* (2013.01); *H04W 4/026* (2013.01); *H04W 4/027* (2013.01); *H04W 4/42* (2018.02)

(58) Field of Classification Search
CPC ......... H04W 36/0005–385; H04W 40/005–38; H04W 48/02–20; H04W 64/00–006; H04W 84/005; H04W 84/18–22; H04W 92/02; H04W 92/04; H04W 92/10
See application file for complete search history.

(56) References Cited

U.S. PATENT DOCUMENTS

| | | | |
|---|---|---|---|
| 9,237,494 B2 | 1/2016 | Sashihara et al. | |
| 9,326,213 B2 | 4/2016 | Catovic et al. | |
| 2006/0205406 A1* | 9/2006 | Pekonen | H04W 24/10 455/436 |
| 2011/0117954 A1* | 5/2011 | Iwamura | H04W 36/0094 455/525 |
| 2013/0095839 A1 | 4/2013 | Venkatraman et al. | |
| 2014/0135010 A1* | 5/2014 | Mohan | H04W 36/0083 455/436 |
| 2018/0077704 A1* | 3/2018 | Adachi | H04W 36/0055 455/436 |

OTHER PUBLICATIONS

Kim S.K., et al., "An Adaptive Handover Decision Algorithm Based on the Estimating Mobility from Signal Strength Measurements", IEEE 60th Vehicular Technology Conference, 2004, VTC2004—Fall, XP010786773, Sep. 26-29, 2004, vol. 2, pp. 1004-1008, DOI: 10.1109/VETECF.2004.1400172, ISBN: 978-0-7803-8521-4.

NTT Docomo et al., "Speed Dependent Scaling of Mobility Control Parameters", 3GPP Draft; R2-075149, 3rd Generation Partnership Project (3GPP), Mobile Competence Centre ; 650, Route Des Lucioles ; F-06921 Sophia-Antipolis Cedex ; France, vol. RAN WG2, No. Jeju; Nov. 12, 2007, Nov. 12, 2007 (Nov. 12, 2007), XP050137596, 7 pages.

* cited by examiner

HANDOVER IN HIGH SPEED NETWORKS

CROSS REFERENCES

The present application for patent claims priority to U.S. Provisional Patent Application No. 62/374,996 by Yang, et al., entitled "Handover In High Speed Networks," filed Aug. 15, 2016, assigned to the assignee hereof.

BACKGROUND

The following relates generally to wireless communication and more specifically to handover in high speed networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless communications systems may use multiple cells in order to support communications with UEs over a large coverage area. As a UE moves relative to different individual cell coverage areas, handover procedures may be used to transfer communications from one cell to the next. In places where cell coverage areas overlap, handover procedures may transfer communications back and forth between two cells in a scenario referred to as "ping-pong handover." Ping-pong handover may reduce system performance, especially in high speed mobility conditions where cell coverage areas may be linearly configured (e.g., networks designed to support users on high speed trains).

SUMMARY

A user equipment (UE) may detect a high speed mobility condition and a directionality of movement (e.g., in relation to one or more cells) based on signal measurements, such as location of the UE or Doppler measurements. The high speed mobility condition may be indicative of a scenario that is prone to ping-pong handover, such as a network configured to support coverage of a high-speed rail line. The UE may adjust parameters that affect a measurement reporting process (e.g., a time-to-trigger (TTT) parameter, signal quality metric, measurement reporting delay, etc.) based on the high speed mobility condition and the directionality of movement. If the UE detects the high speed mobility condition, the UE may add the physical cell identifier (PCI) of the serving cell to a list of recent serving cells. If a neighboring cell is also on the list of recent serving cells, the UE may adjust a measurement reporting process, which may determine whether the UE performs a handover to the neighboring cell. The adjustments to the measurement reporting process may affect whether or when the UE transmits a measurement report, which may affect whether or when the UE is commanded to handover to a neighbor cell. This, in turn, may help reduce ping-pong handover events.

A method of wireless communication is described. The method may include detecting a high speed mobility condition at a UE, detecting a directionality of movement in relation to one or more measured cells, adjusting a measurement reporting process based at least in part on the high speed mobility condition and the directionality of movement, and sending a measurement report to a serving cell based at least in part on the adjusted measurement reporting process.

An apparatus for wireless communication is described. The apparatus may include means for detecting a high speed mobility condition at a UE, means for detecting a directionality of movement in relation to one or more measured cells, means for adjusting a measurement reporting process based at least in part on the high speed mobility condition and the directionality of movement, and means for sending a measurement report to a serving cell based at least in part on the adjusted measurement reporting process.

A mobile device for wireless communication is described. The mobile device may include a processor, memory in electronic communication with the processor, and instructions stored in the memory. The instructions may be operable by the processor to cause the mobile device to detect a high speed mobility condition at a UE, detect a directionality of movement in relation to one or more measured cells, adjust a measurement reporting process based at least in part on the high speed mobility condition and the directionality of movement, and send a measurement report to a serving cell based at least in part on the adjusted measurement reporting process.

A non-transitory computer-readable medium for wireless communication is described. The non-transitory computer-readable medium may include instructions operable to cause a processor to detect a high speed mobility condition at a UE, detect a directionality of movement in relation to one or more measured cells, adjust a measurement reporting process based at least in part on the high speed mobility condition and the directionality of movement, and send a measurement report to a serving cell based at least in part on the adjusted measurement reporting process.

In some examples of the method, apparatus, mobile device, or non-transitory computer-readable medium described herein, the adjusting comprises at least one of adjusting a measurement report, adjusting a measurement report scheduling, adjusting a TTT parameter, or scaling a signal quality metric, or any combination thereof.

In some examples of the method, apparatus, and non-transitory computer-readable medium described above, the signal quality metric comprises at least one of absolute signal strength, relative signal strength, service quality, real-time transport protocol (RTP) loss, RTP delay, or voice RTP jitter, or any combination thereof.

In some examples of the method, apparatus, mobile device, or non-transitory computer-readable medium described herein, the adjusting may be based at least in part on an absolute signal quality of the serving cell, an absolute signal quality of a neighbor cell not on a list of recent serving cells, or the difference between a strongest recent serving cell and the neighbor cell not on the list of recent serving cells.

Some examples of the method, apparatus, mobile device, or non-transitory computer-readable medium described herein may further include processes, features, means, or instructions for performing one or more location measurements, wherein the high speed mobility condition or the directionality of movement may be detected based at least in part on the one or more location measurements.

Some examples of the method, apparatus, and non-transitory computer-readable medium described above may further include processes, features, means, or instructions for determining a Doppler shift parameter of the one or more measured cells, wherein the high speed mobility condition or the directionality of movement may be detected based at least in part on the Doppler shift parameter.

In some examples of the method, apparatus, mobile device, or non-transitory computer-readable medium described herein, the Doppler shift parameter comprises a magnitude of a Doppler frequency shift, a magnitude of a change from a positive Doppler frequency shift to a negative Doppler frequency shift associated with passing a radio resource unit (RRU) of the serving cell, a combination of a positive Doppler frequency shift and a negative Doppler frequency shift from different RRUs of the serving cell, or any combination thereof.

Some examples of the method, apparatus, mobile device, or non-transitory computer-readable medium described herein may further include processes, features, means, or instructions for receiving an indication of the high speed mobility condition from the serving cell, wherein detecting the high speed mobility condition may be based at least in part on the indication.

Some examples of the method, apparatus, mobile device, or non-transitory computer-readable medium described herein may further include processes, features, means, or instructions for adding a PCI of the serving cell to a list of recent serving cells.

Some examples of the method, apparatus, mobile device, or non-transitory computer-readable medium described herein may further include processes, features, means, or instructions for identifying a PCI of a neighbor cell. Some examples of the method, apparatus, mobile device, or non-transitory computer-readable medium described herein may further include processes, features, means, or instructions for determining whether a list of recent serving cells includes the PCI of the neighbor cell, wherein adjusting the measurement reporting process may be based at least in part on the determination.

In some examples of the method, apparatus, mobile device, or non-transitory computer-readable medium described herein, adjusting the measurement reporting process comprises: refraining from performing reporting measurements on at least one neighbor cell on a list of recent serving cells, reducing a frequency of measurements on the at least one neighbor cell on the list of recent serving cells, or increasing a frequency of measurements on at least one neighbor cell not in the list of recent serving cells.

In some examples of the method, apparatus, mobile device, or non-transitory computer-readable medium described herein, the serving cell comprises multiple RRUs. In some examples of the method, apparatus, and non-transitory computer-readable medium described above, the serving cell may be part of a single frequency network (SFN).

DETAILED DESCRIPTION

Some wireless communication systems (e.g., systems designed to support communications along high speed rail lines) may support efficient handover techniques to prevent ping-pong handover. For example, a user equipment (UE) may identify a high speed condition and adjust a measurement reporting procedure. In some cases, a UE may maintain a list of previous serving cells that meet a high speed mobility condition or have a high speed mobility configuration (e.g., serving cells the UE has previously connected to and thus may be associated with potential ping-pong handover). When a UE identifies a target cell (e.g., a previous serving cell or a new neighbor cell) for potential handover, the UE may determine if the target cell is a previous high speed serving cell by determining if the list of cells having the high speed mobility condition includes the PCI of the target cell.

If a UE determines that the target cell is a previous high speed serving cell, the UE may adjust a measurement reporting procedure or other handover parameters to prevent a potential ping-pong handover scenario. For example, the UE may adjust a handover threshold and/or a time to trigger (TTT) timer, or the UE may delay sending a cell measurement report. By adjusting the handover parameters, the UE may allow more time to determine whether to perform a handover procedure with the previous serving cell, thus delaying the probability for undesirable ping-pong handover. Additionally or alternatively, the UE may adjust handover parameters to expedite or facilitate the process of performing a handover procedure with a new neighbor cell (e.g., a high speed mobility cell not on the list of previous serving cells).

Aspects of the disclosure introduced above are described below in the context of a wireless communications system. Examples of systems supporting ping-pong hangover prevention in high speed networks and example process flows of prevention techniques in such systems are then described. Aspects of the disclosure are further illustrated by and described with reference to apparatus diagrams, system diagrams, and flowcharts that relate to ping-pong handover prevention in high speed networks.

Figure 1:
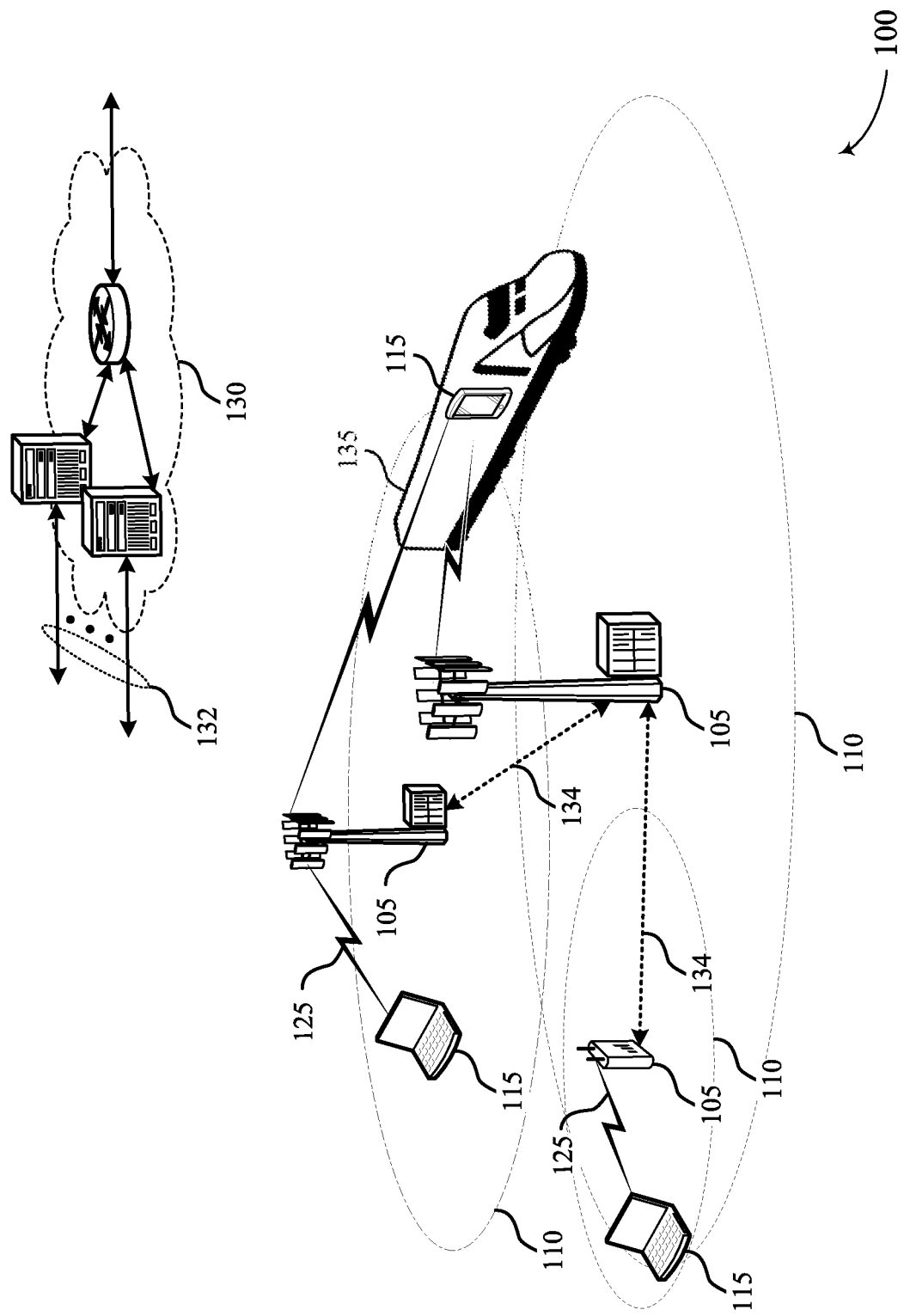
FIGS. 1 and 2 illustrate examples of a system for wireless communication that supports ping-pong handover prevention in high speed networks in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. Wireless communications system 100 may be an example of a high speed dedicated network (e.g., dedicated LTE network) to support communication between a serving cell (e.g., associated with a base station 105) and UEs 115 moving at high speeds (e.g., in high speed trains 135).

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile.

A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. A UE 115 may be located on a high speed train 135 and may thus experience a high speed condition.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A UE 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. As a result, signal processing techniques such as beamforming (i.e., directional transmission) may be used to coherently combine signal energy and overcome the path loss in specific beam directions. In some cases, beamforming may be used to achieve the line-type or linear coverage area.

A high speed LTE network may use a dedicated frequency or a different frequency than another LTE network, such as a public LTE network. In some examples, the dedicated frequency and the frequency of the public LTE network may be immediately adjacent (e.g., there may be no neighbor or intermediate frequencies). The high speed dedicated network may be a single frequency network (SFN) and may include SFN cells associated with a base station 105. An SFN cell may include transmitters and receivers that send control and data signals over a single frequency channel. High speed dedicated networks may include cells (e.g., SFN cells) that support a generally linear coverage pattern (not shown) to mitigate high penetration losses (e.g., 20 dB) for high speed UEs 115 associated with a linear or path-oriented mobility (e.g., along train tracks).

A cell of a network configured to support high speed mobility may utilize multiple radio resource units (RRUs) which may be used to transmit control signals and data to UEs 115. For example, a base station 105 may support a SFN cell associated with multiple RRUs. A geographic coverage area 110 of a base station 105 may refer to the cumulative coverage areas of the multiple RRUs. The multiple RRUs may be associated with the same physical cell identifier (PCI) of the SFN cell. A high speed network may use a PCI to identify a specific cell associated with a base station 105. In some cases, a cell associated with base station 105 may transmit synchronization signals (e.g., primary synchronization signals (PSS) and secondary synchronization signals (SSS)) to a UE 115 that include the PCI.

The same PCI may be used for each RRU associated with a cell. Since multiple RRUs may be associated with a single cell, the UE 115 may forgo synchronization procedures when moving to a portion of the cell's coverage area associated with a different RRU. That is, there may be reduced synchronization overhead when compared to a system in which each RRU is associated with a different cell. Similarly, the RRUs of a cell may enable a reduction in the frequency with which scheduling information and other handover information is passed between cells. That is, combining multiple RRUs into a single cell may enable a reduced number of handovers. However, in some cases, it may not be possible for multiple RRUs associated with one SFN cell to cover the entirety of a high speed network due to line-type or linear coverage limitations, site location limitations, and the impact of using a SFN on the bandwidth available for scheduling multiple users.

Accordingly, some wireless communication systems may support multiple SFN cells that each cover a subset of a high speed network. As such, a mobile UE 115 may identify a basic service area (BSA) of a target cell in the high speed network. In some examples, UE 115 may receive a measurement configuration from its current serving cell, and UE 115 may use the measurement configuration to measure the signal strength or signal quality, or both, of the current serving cell and the target cell. UE 115 may then determine if a condition for performing a handover procedure is met based on its measurement of the signal strength or signal quality, or both, of its current serving cell and the target cell.

In some examples, a signal strength or signal quality of the target cell is greater than a signal strength or signal quality of its current serving cell by a predetermined handover threshold. If any of the conditions for performing a handover procedure is met, UE 115 may start a TTT timer to allow time for UE 115 to determine if the condition for performing the handover procedure remains the same. Once the timer expires, the handover procedure may be triggered and UE 115 may send a measurement report to the current serving cell including information about the signal strength or signal quality of the current serving cell and the target cell. The current serving cell, the target cell, and UE 115 may then coordinate to perform a handover procedure based on the measurement report.

In a high speed network, however, the measurement of the signal strength or signal quality of a current serving cell and a target cell may be affected by a Doppler effect (e.g., Doppler frequency shifting). For example, when a UE 115 moving at a high speed reaches and leaves an RRU, a communication frequency between the UE 115 and its SFN serving cell may change by a factor of two due to the Doppler effect. In other cases, a UE 115 may be physically located between two RRUs with the same PCI, and the UE 115 may receive the same reference signals, control information, and data from both RRUs. In such cases, the UE 115 may receive some signals with a positive Doppler frequency over multiple paths from one RRU and some signals with a negative Doppler frequency over multiple paths from another RRU.

The measurement of the signal strength or signal quality of a current serving cell and a target cell may be further affected by a line type or linear coverage pattern (e.g., via beamforming) associated with RRUs in an SFN cell associated with a base station 105. In some cases, the chances of an overlap between coverage areas may increase due to the increased range of an SFN cell that supports a line-type or linear coverage pattern. These additional factors may affect the measurements at a UE 115 moving at high speeds and, by extension, may affect a decision to perform a handover procedure for the UE 115. Accordingly, the chances of a ping-pong handover may increase since the UE 115 may identify multiple potential serving cells (e.g., previous serving cells and new neighbor cells). In some examples, a ping-pong handover may be the handover of a UE 115 from a first cell to a second cell, followed by a handover back to the first cell in a short amount of time.

A ping-pong handover may be problematic for a UE 115 moving at high speeds in one direction since the quality of service of a previous serving cell may rapidly deteriorate. Additionally, throughput may be degraded during a ping-pong handover caused by line-type coverage overlap. For example, Voice over LTE (VoLTE) quality may be reduced due to real-time transfer protocol (RTP) losses resulting in the possibility of dropped calls. RTP is a communication protocol that provides end-to-end network transport functions suitable for applications transmitting real-time data, such as audio and video over multicast or unicast networks; and the benefits of an RTP scheme may be diminished in ping-pong handover situations. Additionally, signal to interference plus noise ratio (SINR) may decrease and, as a result, a base station 105 may reduce a modulation and coding scheme (MCS) resulting in low throughput. Wireless communications system 100 may thus support efficient handover techniques to prevent ping-pong handovers.

Figure 2:
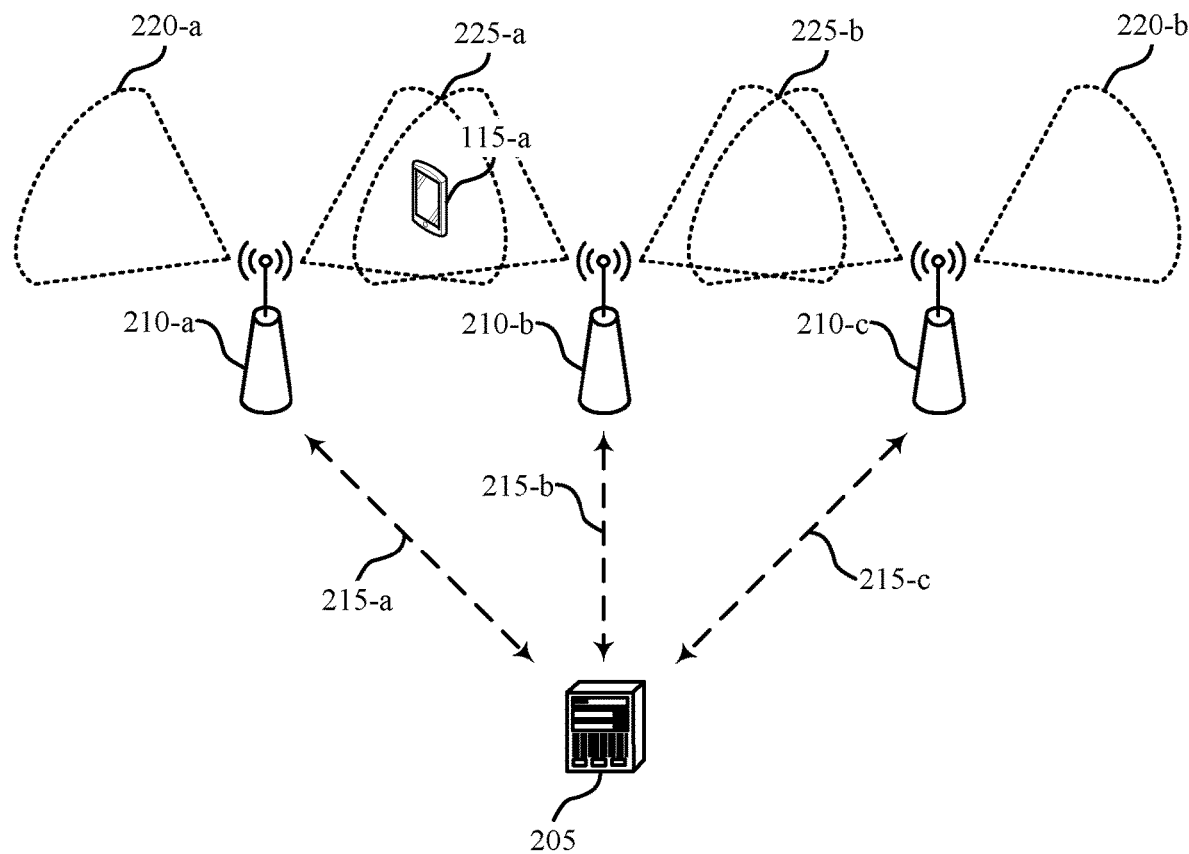

FIG. 2 illustrates an example of a wireless communications system 200 that supports preventing ping-pong handover in accordance with aspects of the present disclosure. The wireless communications system 200 may include a base station or cell 205 in communication with RRUs 210 via communication links 215. The cell 205 may communicate with UE 115-a that is within an RRU coverage area 220. The components and devices of wireless communications system 200 may illustrate examples of and operations with wireless communications system 100 described with reference to FIG. 1. In some cases, a UE 115-a may maintain a list of previous serving cells that have a high speed mobility condition. As such, when a UE 115-a identifies a target cell (e.g., a previous serving cell or a new neighbor cell), the UE 115-a may determine if the target cell is a previous high speed serving cell by, for example, determining if the list of cells having the high speed mobility condition includes the PCI of the target cell.

If UE 115-a determines that a target cell is a previous high speed serving cell, the UE 115-a may adjust a measurement reporting procedure or other handover parameters to prevent ping-pong handover. For example, the UE 115-a may adjust a handover threshold and/or a TTT timer, or the UE 115-a may delay sending a measurement report. By adjusting the handover parameters, the UE 115-a may allow more time to determine whether to perform a handover procedure with a previous serving cell (e.g., which may reduce the likelihood of performing a ping-pong handover). Additionally, the UE 115-a may adjust handover parameters to expedite the process of performing a handover procedure with a new neighbor cell.

Cell 205 may be an SFN cell that includes multiple RRUs 210 associated with a single PCI. For example, a base station 105 may include a cell 205 connected to multiple RRUs 210. The cell 205 may communicate with RRUs 210 over communication links 215. The RRUs 210 may support a line-type coverage pattern to cover an RRU coverage area 220. In some cases, the line-type coverage pattern may mitigate high penetration losses (e.g., 20 dB) for UE s 115 moving at high speeds. In some cases, an RRU coverage area of an RRU 210-a may overlap with an RRU coverage area of an RRU 210-b at overlapping coverage region 225-a.

In some examples, a UE 115 moving at high speeds may pass through overlapping coverage regions 225. In the case that RRU 210-a and RRU 210-b are associated with the same PCI (e.g., of cell 205), the synchronization between the RRUs 210 and a UE 115 may be the same for all RRUs 210. As such, RRU 210-a and RRU 210-b may avoid synchronizing with UE 115. Additionally, RRU 210-a and RRU 210-b may avoid scheduling time and frequency resources for communication with UE 115. This reduced overhead may result in less frequent handovers and less frequent transmissions of measurement reports to a serving cell 205.

In some cases, it may not be possible for multiple RRUs 210 associated with one cell 205 to cover the entirety of a high speed network due to line-type coverage limitations and site location limitations. Accordingly, a high speed network may include multiple cells 205. A cell 205 may be an example of a high speed serving cell, a previous high speed serving cell, or a new neighbor cell. In some examples, a serving cell may refer to a cell that is currently serving a UE 115 and actively communicating with the UE 115. A previous cell may refer to a cell that the UE 115 was previously connected to before performing a handover to a current serving cell, and a new neighbor cell may be a cell that is within the range of the UE 115 and is not on a list of previous serving cells.

In some cases, UE 115-a may record a list of high speed serving cells (e.g., LTE cells) that includes previous high speed serving cells and a current high speed serving cell. The list may include PCIs of such high speed cells to reduce the chances of ping-pong handover by allowing the UE 115 to identify, for example, new neighbor cells. A UE 115-a may add a serving cell to the list of high speed serving cells based on a high speed flag included by the serving cell in Radio Resource Control (RRC) messages received by the UE 115-a. In some cases, the serving cell may include the high speed flag in physical random access channel (PRACH) configuration information.

The UE 115-a may also include a serving cell in the list of high speed serving cells if its speed is above a specified threshold. In some examples, the UE 115 may use global positioning services (GPS) or an average measure of Doppler frequency shifting to determine if its speed is above the specified threshold. Additionally, the UE 115-a may include a serving cell in the list of high speed serving cells if a Doppler frequency change is greater than a factor of two when the UE 115-a reaches and leaves a RRU 210 or if the UE 115-a receives multiple path signals with a positive Doppler frequency periodically and multiple path signals with a negative Doppler frequency periodically.

After determining the list of high speed serving cells, the UE 115-*a* may use this information to adjust handover parameters. In some examples, the UE 115-*a* may adjust a handover threshold or a TTT timer, or both. Additionally or alternatively, the UE 115-*a* may delay sending a measurement report or expedite sending a measurement report. In some cases, this adjustment of handover parameters may apply to handovers associated with a certain number of previous serving cells (e.g., N previous serving cells within a predetermined time frame) included in the list of high speed serving cells. In the case that a UE 115-*a* is not moving at a high speed, the UE 115-*a* may maintain the handover threshold, TTT timer, or measurement report scheduling for a previous serving cell included in the list of high speed serving cells.

A UE 115-*a* may also use signal strength and/or signal quality information for previous serving cells and a current serving cell to adjust handover parameters. For example, if the signal strength and/or signal quality of a previous serving cell is greater than the signal strength and/or signal quality of a current serving cell by a predetermined threshold, a TTT timer for the previous serving cell has expired, and a TTT timer for a new neighbor cell has not expired, the UE 115-*a* may delay sending a measurement report to the previous serving cell. Additionally, if the signal strength and/or signal quality of a previous serving cell is greater than a signal strength or signal quality of a current serving cell by a predetermined threshold, a TTT timer for a previous serving cell has expired, and the signal strength and/or signal quality of the current serving cell is above a UE 115-*a* internal defined threshold or an RTP loss, delay, or jitter is below a UE 115-*a* internal defined threshold, the UE 115-*a* may delay sending a measurement report to the previous serving cell.

Additionally or alternatively, a UE 115-*a* may use the signal strength and/or signal quality information for previous serving cells and new neighbor cells to adjust handover parameters. In such cases, the UE 115-*a* may determine the difference between the signal strength or signal quality of previous serving cells and new neighbor cells. In some examples, if the difference is above a predetermined threshold, the UE 115-*a* may determine not to delay sending a measurement report to a previous serving cell. Additionally, if the difference is below a predetermined threshold, the UE 115-*a* may delay sending a measurement report to a previous serving cell. So a UE 115-*a* may have more or less time to determine which cell will provide a higher quality of service based on a comparison between the signal strength and/or the signal quality of the previous serving cells and the new neighbor cells.

In some cases, a UE 115-*a* may use the signal strength and/or signal quality information for a current serving cell to adjust handover parameters. The UE 115-*a* may consider the absolute signal strength, a relative signal strength, the absolute signal quality, or a service quality (e.g., RTP loss, RTP delay, and jitter) of a current serving cell before sending a measurement report for a previous serving cell. In some examples, the handover threshold or TTT timer may be increased for a previous serving cell. As such, a UE 115-*a* may have more time to determine the service quality of a current serving cell before performing a handover procedure. This increase in time may reduce the chances of the UE 115-*a* sending a measurement report to a previous serving cell and, by extension, may reduce the chances of a ping-pong handover.

In some examples, the amount of adjustment to the handover parameters may be based on signal strength or signal quality information. The signal strength or signal quality information may be associated with a current serving cell or a new neighbor cell. Additionally, the amount of adjustment to the handover parameters may be based on a comparison between a signal strength or signal quality of a strongest previous serving cell and a new neighbor cell. In some cases, the handover threshold or TTT timer may be decreased for a new neighbor cell. Additionally, a UE 115-*a* may send a measurement report to previous serving cells (e.g., N previous serving cells) within a UE 115-*a* predefined time window, or the UE 115-*a* may reduce the frequency of performing a measurement for previous high speed serving cells.

Figure 3:
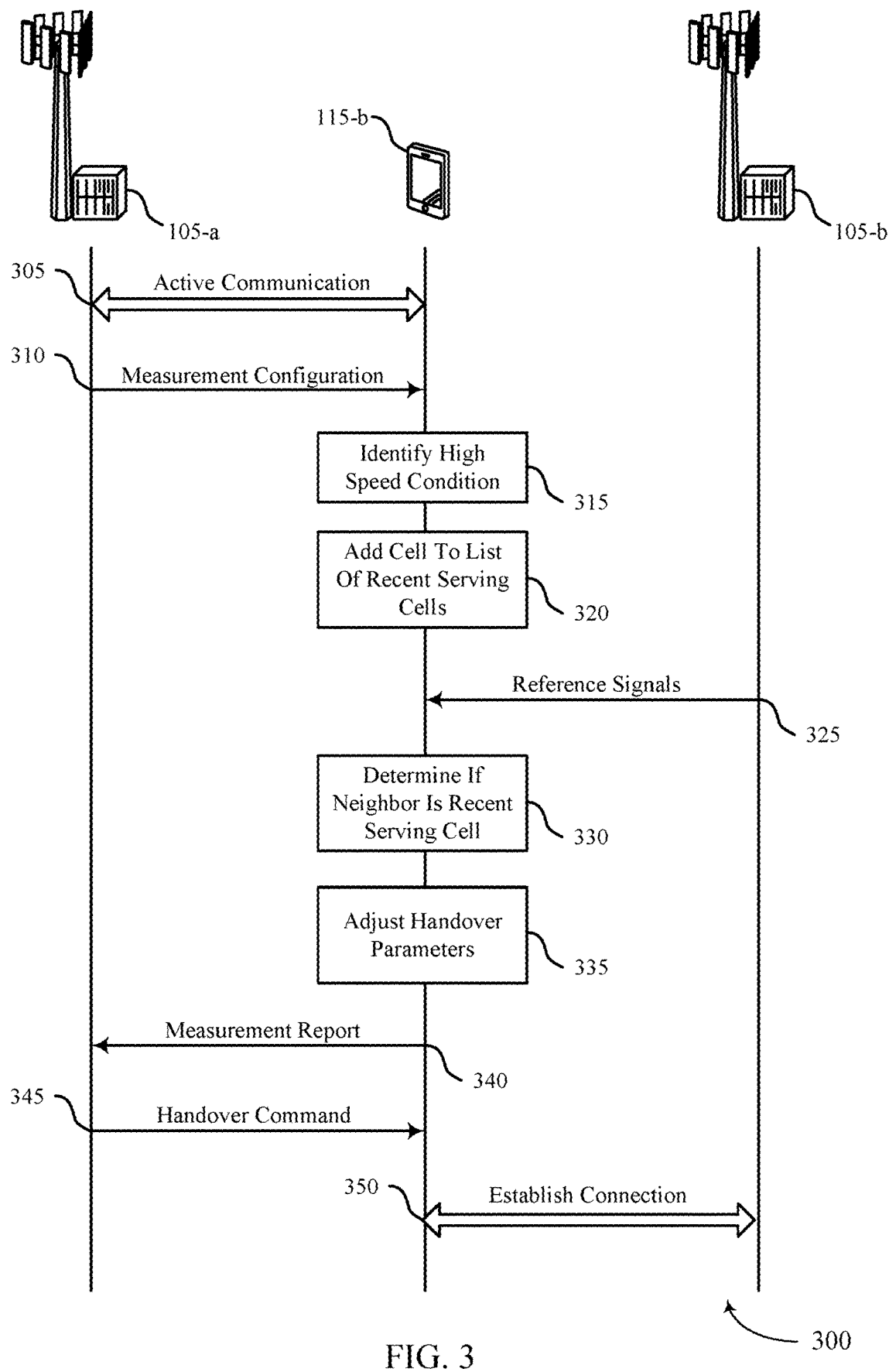
FIG. 3 illustrates an example of a process flow in a system that supports ping-pong handover prevention in high speed networks in accordance with aspects of the present disclosure.

FIG. 3 illustrates an example of a process flow 300 that supports operations to prevent ping-pong handover in high speed networks. Process flow 300 may include steps performed by UE 115-*b*, which may be an example of a UE 115 described above with reference to FIGS. 1 and 2. Process flow 300 may also include steps performed by a serving base station 105-*a*, and a neighboring base station 105-*b*, each of which may include multiple RRUs, and may be examples of a base station 105 described above with reference to FIGS. 1 and 2.

At step 305, a serving cell associated with base station 105-*a* may communicate with a UE 115-*b*. In some cases, the serving cell may include multiple RRUs, and the serving cell may be a part of an SFN.

At step 310, a serving cell associated with base station 105-*a* may transmit a measurement configuration to UE 115-*b*. The UE 115-*b* may use the measurement configuration to measure the signal strength or signal quality, or both, of a serving cell associated with base station 105-*a* or a neighbor cell associated with base station 105-*b*.

At block 315, UE 115-*b* may identify a high speed mobility condition or a directionality of movement, or both. For example, UE 115-*b* may determine that its speed is above a threshold, or that a serving cell is configured for supporting high speeds (e.g., the base serving base station 105-*a* may be configured with multiple RRUs, or may have a line type coverage geometry). UE 115-*b* may detect a high speed mobility condition and a directionality of movement based on signal measurements performed by the UE 115-*b*.

In some cases, the UE 115-*b* may detect the directionality of movement based on a location measurement. The identification of a high speed serving cell may include determining that the serving cell has a high speed mobility condition that supports unidirectional mobility with a plurality of coverage areas along a linear path. In some cases, the UE 115-*b* may identify a high speed serving cell by first determining that its speed of mobility along the linear path exceeds a threshold. In other cases, the identification of a high speed serving cell may include receiving an indication of the high speed mobility condition from the serving cell associated with base station 105-*a*.

Additionally or alternatively, the identification of a high speed serving cell and the directionality of movement of the UE 115-*b* may be based on a measurement of Doppler shift parameters at UE 115-*b*. In some examples, Doppler shift parameters may include a magnitude of a Doppler frequency shift or a magnitude of a change from a positive Doppler frequency shift to a negative Doppler frequency shift associated with passing an RRU of the serving cell, or both. Doppler shift parameters may also include a combination of a positive Doppler frequency shift and a negative Doppler frequency shift from different RRUs of the serving cell.

At block 320, UE 115-*b* may add the serving cell associated with base station 105-*a* to a list of recent high speed serving cells after determining that the serving cell is a high speed serving cell. UE 115-*b* may identify a PCI of the serving cell and add the PCI of the serving cell to a list of cells having the high speed mobility condition. Accordingly, the identification of a high speed serving cell at block 315 may include identifying a PCI of the serving cell and determining that a list of cells having the high speed mobility condition includes the PCI of the serving cell.

At step 325, a neighbor cell associated with a neighbor base station 105-*b* may transmit synchronization signals (e.g., PSS and SSS) to a UE 115-*b*. UE 115-*b* may identify the neighbor cell associated with base station 105-*b* based on the transmission.

At block 330, UE 115-*b* may determine whether the new neighbor cell associated with the base station 105-*b* is a high speed serving cell. In some cases, UE 115-*b* may first identify a PCI of the new neighbor cell (e.g., from the PSS and SSS at step 325). UE 115-*b* may then determine that a list of cells having the high speed mobility condition includes the PCI of the new neighbor cell.

At block 335, UE 115-*b* may adjust a measurement reporting procedure of other handover parameters to prevent the chances of performing a ping-pong handover. In some cases, the handover parameters may include a signal strength threshold, a signal quality threshold, a TTT timer, or a measurement report scheduling. In some cases, UE 115-*b* may scale the signal quality threshold or the TTT timer for a serving cell on the list of recent high speed serving cells. UE 115-*b* may adjust the handover parameters based on an absolute signal strength or signal quality of the serving cell or an absolute signal strength or signal quality of a neighbor cell that is not on the list of recent serving cells. In some cases, UE 115-*b* may identify the PCI of a neighbor cell and adjust the handover parameters based on determining whether a list of recent serving cells includes the PCI of the neighbor cell.

Additionally, UE 115-*b* may adjust the handover parameters based on a difference between the strongest recent serving cell and the neighbor cell that is not on the list of recent serving cells. UE 115-*b* may also scale a signal quality metric or a TTT timer for a neighbor cell that is not on the list of recent serving cells, or UE 115-*b* may determine to refrain from performing reporting measurements on a recent serving cell on the list of recent serving cells. Additionally or alternatively, UE 115-*b* may reduce a frequency of measurements for a serving cell on the list of recent serving cells, or increase a frequency of measurements for a neighbor cell that is not on the list of recent serving cells.

At step 340, UE 115-*b* may transmit a measurement report to a serving cell associated with base station 105-*a*. In some cases, UE 115-*b* may compare a signal quality metric (e.g., an absolute signal strength, service quality, RTP loss, RTP delay, or voice RTP jitter) of the serving cell and a signal quality metric of the set of recent serving cells on the list of recent serving cells. UE 115-*b* may then delay transmission of the measurement report associated with a recent serving cell based on the comparison. Additionally, UE 115-*b* may compare a signal quality metric of the serving cell, a signal quality metric of a set of recent serving cells on the list of recent serving cells, and a signal quality metric of the neighbor cell. UE 115-*b* may then transmit the measurement report associated with a recent serving cell on the list based on the comparison.

At step 345, base station 105-*a* may transmit a handover command to the UE 115-*b* based on the measurement report (e.g., if the measurement report indicates that a handover is appropriate). In some cases, base station 105-*a* may refrain from transmitting a handover command if the measurement report indicates that a handover is not appropriate (i.e., the adjusted measurement reporting procedures may prevent a ping-pong handover). At step 350, UE 115-*b* may establish a connection with the neighbor cell associated with base station 105-*b* in accordance with the handover command.

Figure 4:
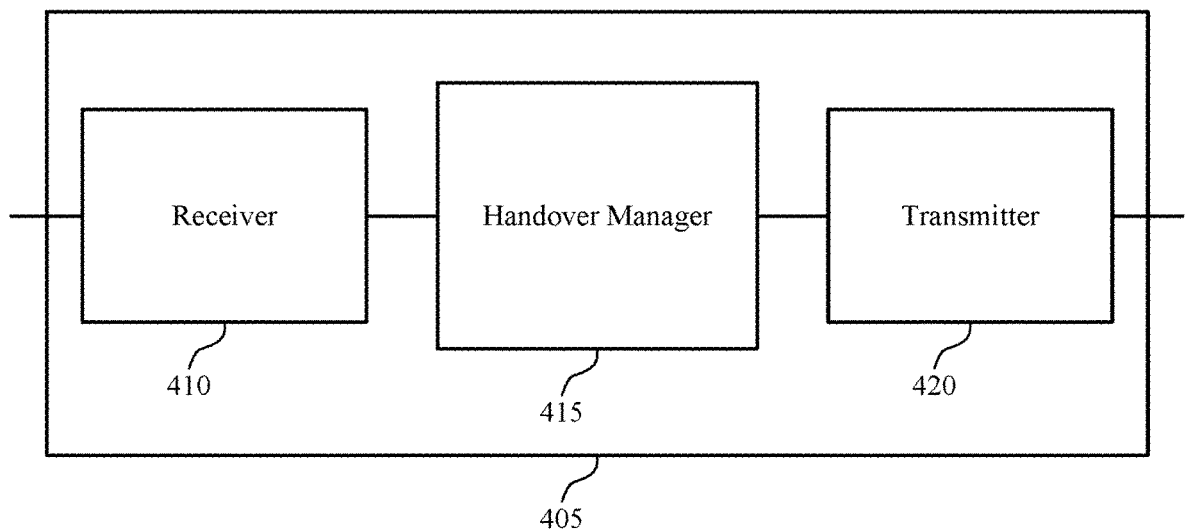
FIGS. 4 through 6 show block diagrams of a mobile device or mobile devices that supports ping-pong handover prevention in high speed networks in accordance with aspects of the present disclosure.

FIG. 4 shows a block diagram 400 of a mobile device 405 that supports ping-pong handover prevention in high speed networks in accordance with various aspects of the present disclosure. Mobile device 405 may be an example of aspects of a UE 115 as described with reference to FIG. 1. Mobile device 405 may include receiver 410, handover manager 415, and transmitter 420. Mobile device 405 may also include a processor. Each of these components may be in communication with one another (e.g., via one or more buses).

Receiver 410 may receive information such as packets, user data, or control information associated with various information channels (e.g., control channels, data channels, and information related to ping-pong handover prevention in high speed networks, etc.). Information may be passed on to other components of the device. The receiver 410 may be an example of aspects of the transceiver 735 described with reference to FIG. 7.

Handover manager 415 may be an example of aspects of the handover manager 715 described with reference to FIG. 7. Handover manager 415 may detect a high speed mobility condition at a UE, detect a directionality of movement based on signal measurements, and adjust a measurement reporting process based on the high speed mobility condition and the directionality of movement. Further, the handover manager 415 may send a measurement report to a serving cell based on the adjusted measurement reporting process. Handover manager 415 may perform various functions in combination with receiver 410 or transmitter 420. For example, handover manager may make determinations about the speed or directionality of movement of mobile device 405 based on signals received via receiver 410. Handover manager 415 may send measure reports, or other signaling, via transmitter 420.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
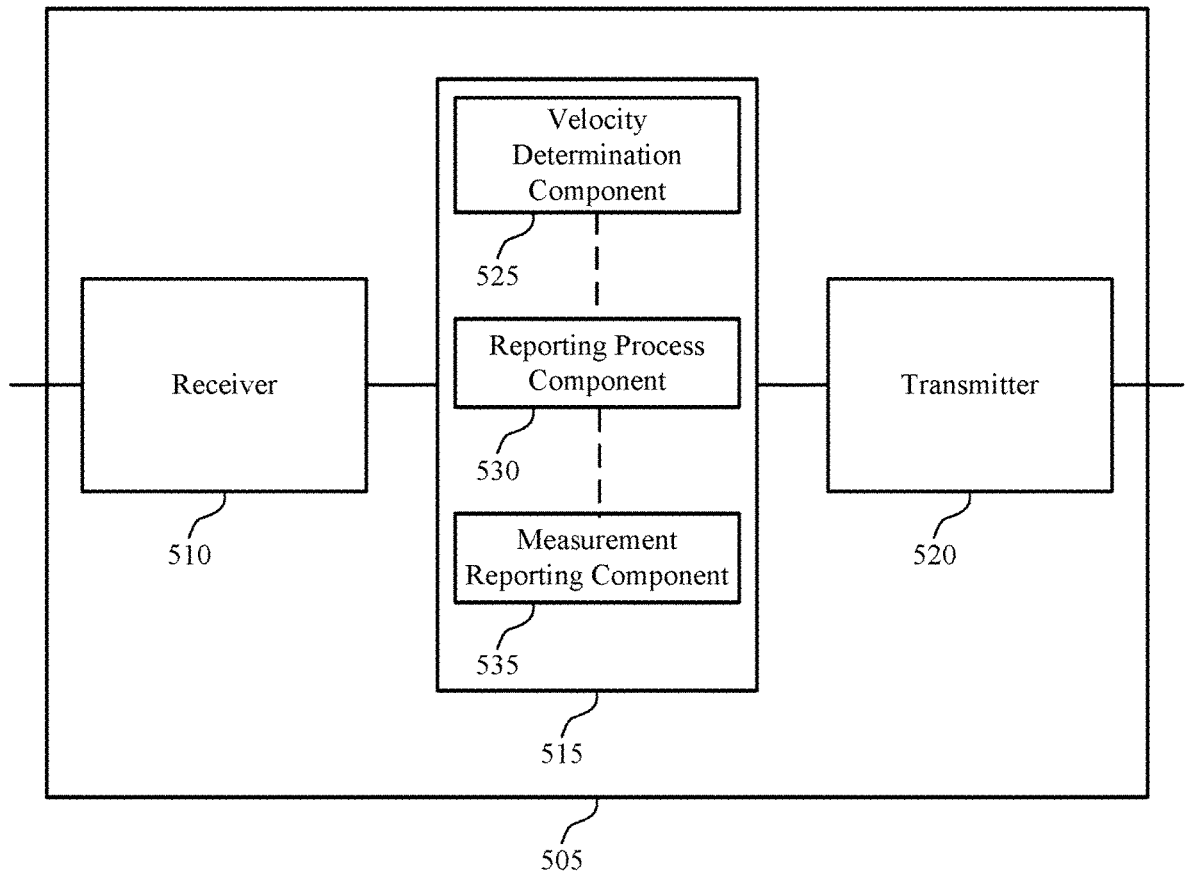

FIG. 5 shows a block diagram 500 of a mobile device 505 that supports ping-pong handover prevention in high speed networks in accordance with various aspects of the present disclosure. Mobile device 505 may be an example of aspects of a mobile device 405 or a UE 115 as described with reference to FIGS. 1 and 4. Mobile device 505 may include receiver 510, handover manager 515, and transmitter 520. Mobile device 505 may also include a processor. Each of these components may be in communication with one another (e.g., via one or more buses).

Receiver 510 may receive information such as packets, user data, or control information associated with various information channels (e.g., control channels, data channels, and information related to ping-pong handover prevention in high speed networks, etc.). Information may be passed on to other components of the device. The receiver 510 may be an example of aspects of the transceiver 735 described with reference to FIG. 7.

Handover manager 515 may be an example of aspects of the handover manager 715 described with reference to FIG. 7. Handover manager 515 may also include velocity determination component 525, reporting process component 530, and measurement reporting component 535.

Velocity determination component 525 may perform one or more location measurements, where the high speed mobility condition or the directionality of movement is detected based on the one or more location measurements. Velocity determination component 525 may detect a high speed mobility condition at the mobile device 505, receive an indication of the high speed mobility condition from the serving cell (e.g., where detecting the high speed mobility condition is based on the indication), and detect a directionality of movement based on signal measurements. Velocity determination component 525 may make various determinations based on signals received via receiver 510.

Reporting process component 530 may adjust a measurement reporting process based on the high speed mobility condition and the directionality of movement. In some cases, the adjusting includes at least one of adjusting a measurement report, adjusting a measurement report scheduling delay (e.g., adjusting measurement report scheduling), adjusting a TTT parameter, or scaling a signal quality metric, or any combination thereof. In some cases, the signal quality metric includes at least one of absolute signal strength, service quality, RTP loss, RTP delay, or voice RTP jitter, or any combination thereof. In some cases, adjusting the measurement reporting process includes refraining from performing reporting measurements on at least one neighbor cell on a list of recent serving cells, reducing a frequency of measurements on the at least one neighbor cell, and/or increasing a frequency of measurements on at least one neighbor cell not in the list of recent serving cells.

Measurement reporting component 535 may, in combination with transmitter 520, send a measurement report to a serving cell based on the adjusted measurement reporting process. In some cases, the serving cell includes multiple RRUs. In some cases, the serving cell is part of a SFN.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
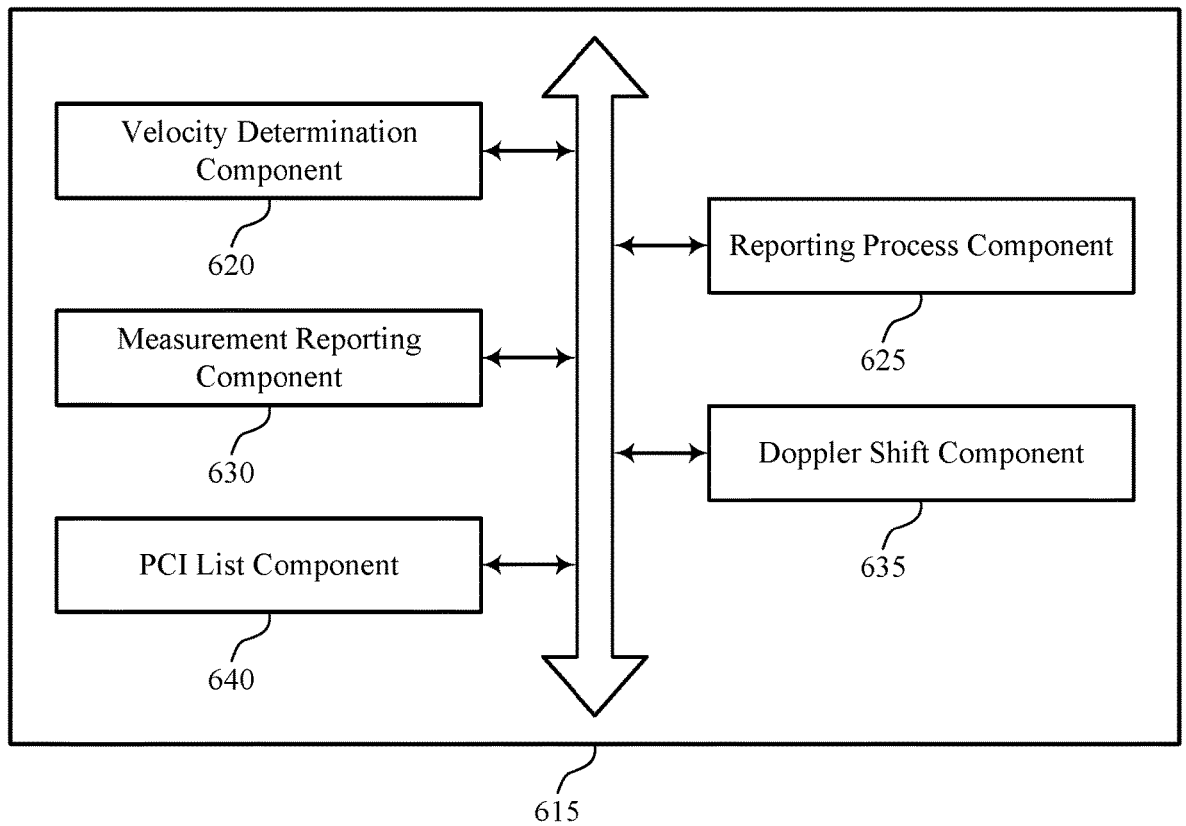

FIG. 6 shows a block diagram 600 of a handover manager 615 that supports ping-pong handover prevention in high speed networks in accordance with various aspects of the present disclosure. The handover manager 615 may be an example of aspects of a handover manager 415, a handover manager 515, or a handover manager 715 described with reference to FIGS. 4, 5, and 7. The handover manager 615 may include velocity determination component 620, reporting process component 625, measurement reporting component 630, Doppler shift component 635, and PCI list component 640. Each of these modules may communicate, directly or indirectly, with one another (e.g., via one or more buses).

Velocity determination component 620 may perform one or more location measurements, where the high speed mobility condition or the directionality of movement is detected based on the one or more location measurements. Velocity determination component 620 may detect a high speed mobility condition at a UE, receive an indication of the high speed mobility condition from the serving cell (e.g., where detecting the high speed mobility condition is based on the indication), and detect a directionality of movement based on signal measurements.

Reporting process component 625 may adjust a measurement reporting process based on the high speed mobility condition and the directionality of movement. In some cases, the adjusting includes at least one of adjusting a measurement report, adjusting a measurement report scheduling delay, adjusting a TTT parameter, or scaling a signal quality metric. In some cases, the signal quality metric includes at least one of absolute signal strength, service quality, RTP loss, RTP delay, or voice RTP jitter, or any combination thereof. In some cases, adjusting the measurement reporting process includes refraining from performing reporting measurements on at least one neighbor cell on a list of recent serving cells, reducing a frequency of measurements on the at least one neighbor cell, and/or increasing a frequency of measurements on at least one neighbor cell not in the list of recent serving cells.

Measurement reporting component 630 may send a measurement report to a serving cell based on the adjusted measurement reporting process. In some cases, the serving cell includes multiple RRUs. In some cases, the serving cell is part of a SFN.

Doppler shift component 635 may determine a Doppler shift parameter, where the high speed mobility condition or the directionality of movement is detected based on the Doppler shift parameter. In some cases, the Doppler shift parameter includes a magnitude of a Doppler frequency shift, a magnitude of a change from a positive Doppler frequency shift to a negative Doppler frequency shift associated with passing a RRU of the serving cell, a combination of a positive Doppler frequency shift and a negative Doppler frequency shift from different RRUs of the serving cell, or any combination thereof.

PCI list component 640 may add a PCI of the serving cell to a list of recent serving cells (e.g., a list of recent serving cells maintained by a UE). Further, PCI list component 640 may identify a PCI of a neighbor cell and determine whether the list of recent serving cells includes the PCI of the neighbor cell. In some cases, the reporting process component 625 may adjust the measurement reporting process based on the determination.

Figure 7:
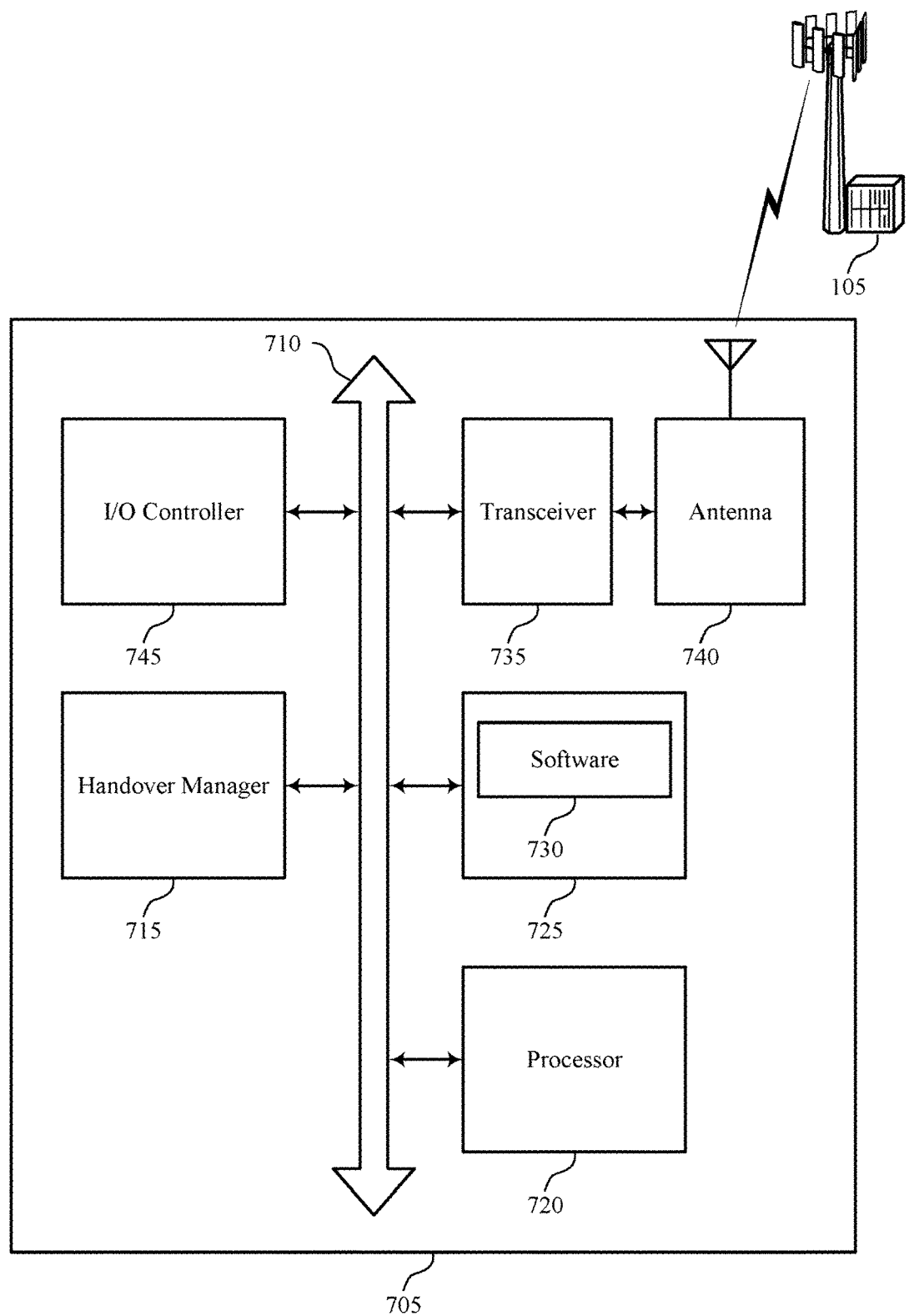
FIG. 7 illustrates a block diagram of a system including a mobile device that supports ping-pong handover prevention in high speed networks in accordance with aspects of the present disclosure.

FIG. 7 shows a diagram of a system 700 including a device 705 that supports ping-pong handover prevention in high speed networks in accordance with various aspects of the present disclosure. Device 705 may be an example of or include the components of mobile device 405, mobile device 505, or a UE 115 as described above, e.g., with reference to FIGS. 1, 4 and 5. Device 705 may include components for bi-directional voice and data communications including components for transmitting and receiving communications, including handover manager 715, processor 720, memory 725, software 730, transceiver 735, antenna 740, and I/O controller 745. These components may be in electronic communication via one or more busses (e.g., bus 710). Device 705 may communicate wirelessly with one or more base stations 105.

Processor 720 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof).

In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting ping-pong handover prevention in high speed networks).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support ping-pong handover prevention in high speed networks. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system.

Figure 8:
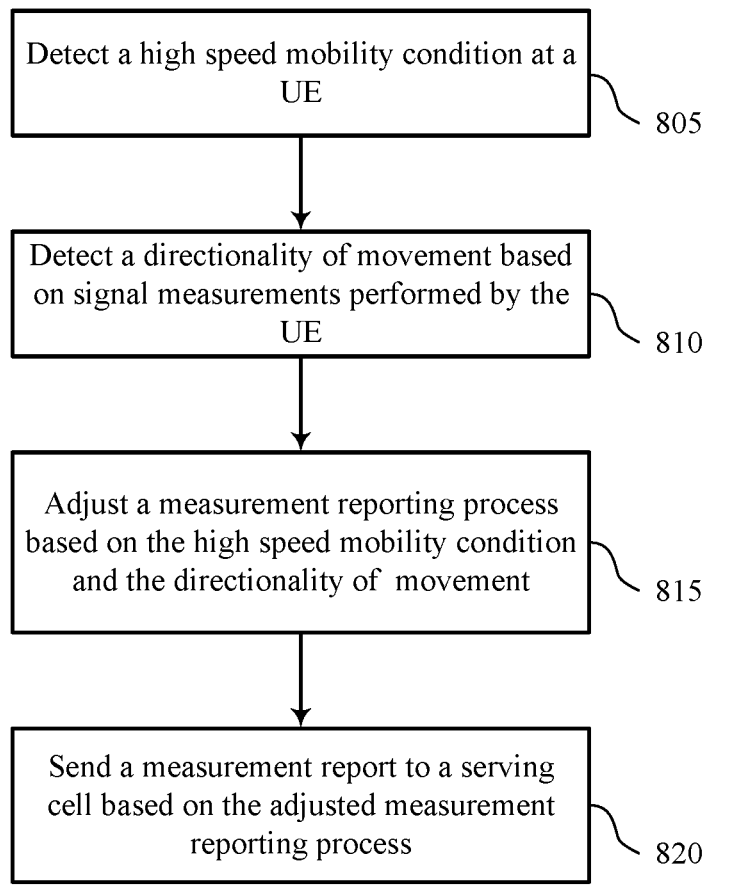
FIGS. 8 through 10 illustrate methods for ping-pong handover prevention in high speed networks in accordance with aspects of the present disclosure.

FIG. 8 shows a flowchart illustrating a method 800 for ping-pong handover prevention in high speed networks in accordance with various aspects of the present disclosure. The operations of method 800 may be implemented by a UE 115 or its components as described herein. For example, the operations of method 800 may be performed by a handover manager as described with reference to FIGS. 4 through 7. In some examples, a UE 115 may execute a set of codes to control the functional elements of the device to perform the functions described below. Additionally or alternatively, the UE 115 may perform aspects the functions described below using special-purpose hardware.

At block 805 the UE 115 may detect a high speed mobility condition at a UE. The operations of block 805 may be performed according to the methods described with reference to FIGS. 1 through 3. In certain examples, aspects of the operations of block 805 may be performed by a velocity determination component as described with reference to FIGS. 4 through 7.

At block 810 the UE 115 may detect a directionality of movement (e.g., in relation to one or more measured cells) based at least in part on signal measurements performed by the UE. The operations of block 810 may be performed according to the methods described with reference to FIGS. 1 through 3. In certain examples, aspects of the operations of block 810 may be performed by a velocity determination component as described with reference to FIGS. 4 through 7.

At block 815 the UE 115 may adjust a measurement reporting process based at least in part on the high speed mobility condition and the directionality of movement. The operations of block 815 may be performed according to the methods described with reference to FIGS. 1 through 3. In certain examples, aspects of the operations of block 815 may be performed by a reporting process component as described with reference to FIGS. 4 through 7.

At block 820 the UE 115 may send a measurement report to a serving cell based at least in part on the adjusted measurement reporting process. The operations of block 820 may be performed according to the methods described with reference to FIGS. 1 through 3. In certain examples, aspects of the operations of block 820 may be performed by a measurement reporting component as described with reference to FIGS. 4 through 7.

Figure 9:
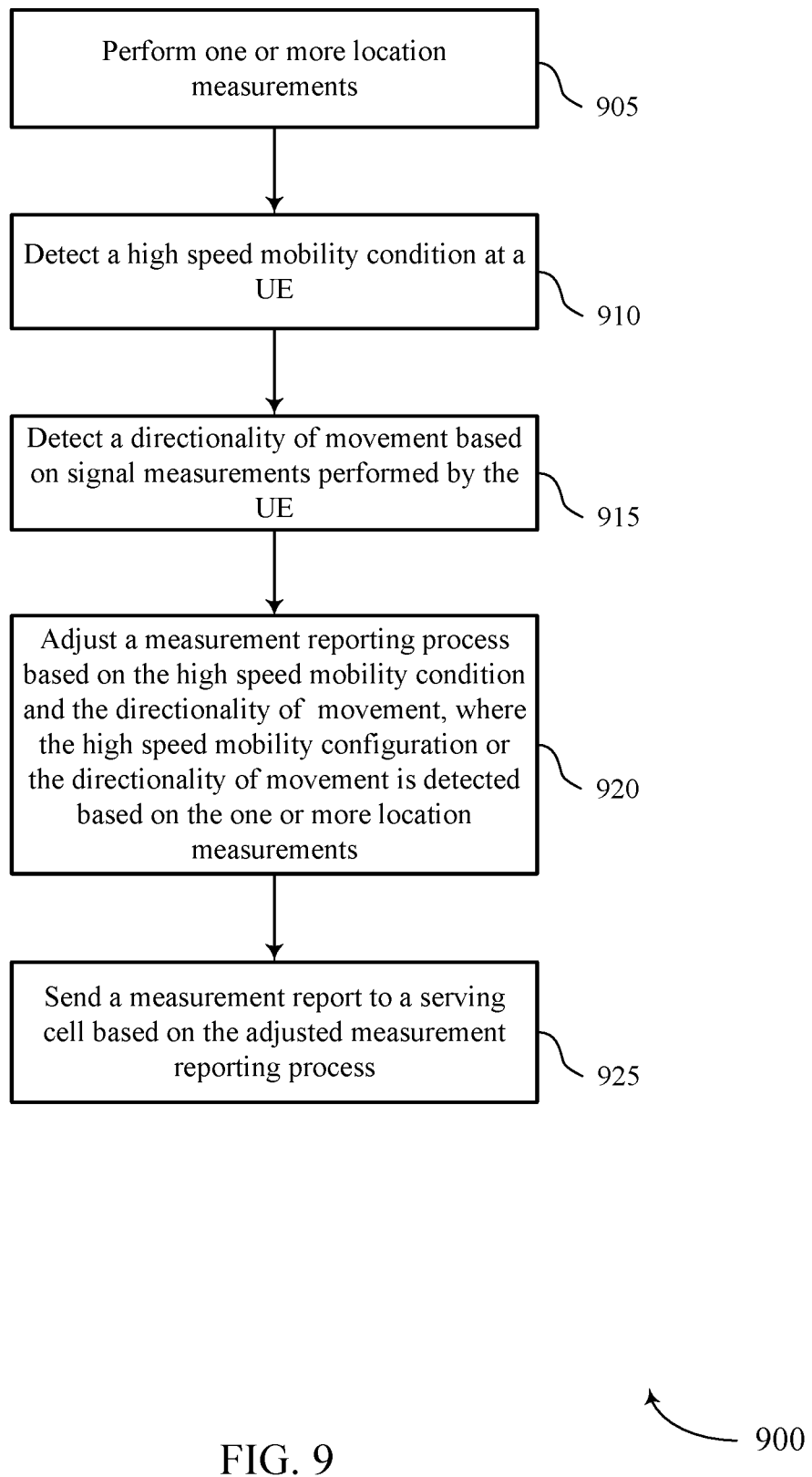

FIG. 9 shows a flowchart illustrating a method 900 for ping-pong handover prevention in high speed networks in accordance with various aspects of the present disclosure. The operations of method 900 may be implemented by a UE 115 or its components as described herein. For example, the operations of method 900 may be performed by a handover manager as described with reference to FIGS. 4 through 7. In some examples, a UE 115 may execute a set of codes to control the functional elements of the device to perform the functions described below. Additionally or alternatively, the UE 115 may perform aspects the functions described below using special-purpose hardware.

At block 905 the UE 115 may perform one or more location measurements. The operations of block 905 may be performed according to the methods described with reference to FIGS. 1 through 3. In certain examples, aspects of the operations of block 905 may be performed by a velocity determination component as described with reference to FIGS. 4 through 7.

At block 910 the UE 115 may detect a high speed mobility condition at a UE. In some cases, the high speed mobility condition is detected based at least in part on the one or more location measurements. The operations of block 910 may be performed according to the methods described with reference to FIGS. 1 through 3. In certain examples, aspects of the operations of block 910 may be performed by a velocity determination component as described with reference to FIGS. 4 through 7.

At block 915 the UE 115 may detect a directionality of movement based at least in part on signal measurements performed by the UE. In some cases, the directionality of movement is detected based at least in part on the one or more location measurements. The operations of block 915 may be performed according to the methods described with reference to FIGS. 1 through 3. In certain examples, aspects of the operations of block 915 may be performed by a velocity determination component as described with reference to FIGS. 4 through 7.

At block 920 the UE 115 may adjust a measurement reporting process based at least in part on the high speed mobility condition and the directionality of movement. The operations of block 920 may be performed according to the methods described with reference to FIGS. 1 through 3. In certain examples, aspects of the operations of block 920 may be performed by a reporting process component as described with reference to FIGS. 4 through 7.

At block 925 the UE 115 may send a measurement report to a serving cell based at least in part on the adjusted measurement reporting process. The operations of block 925 may be performed according to the methods described with reference to FIGS. 1 through 3. In certain examples, aspects of the operations of block 925 may be performed by a measurement reporting component as described with reference to FIGS. 4 through 7.

Figure 10:
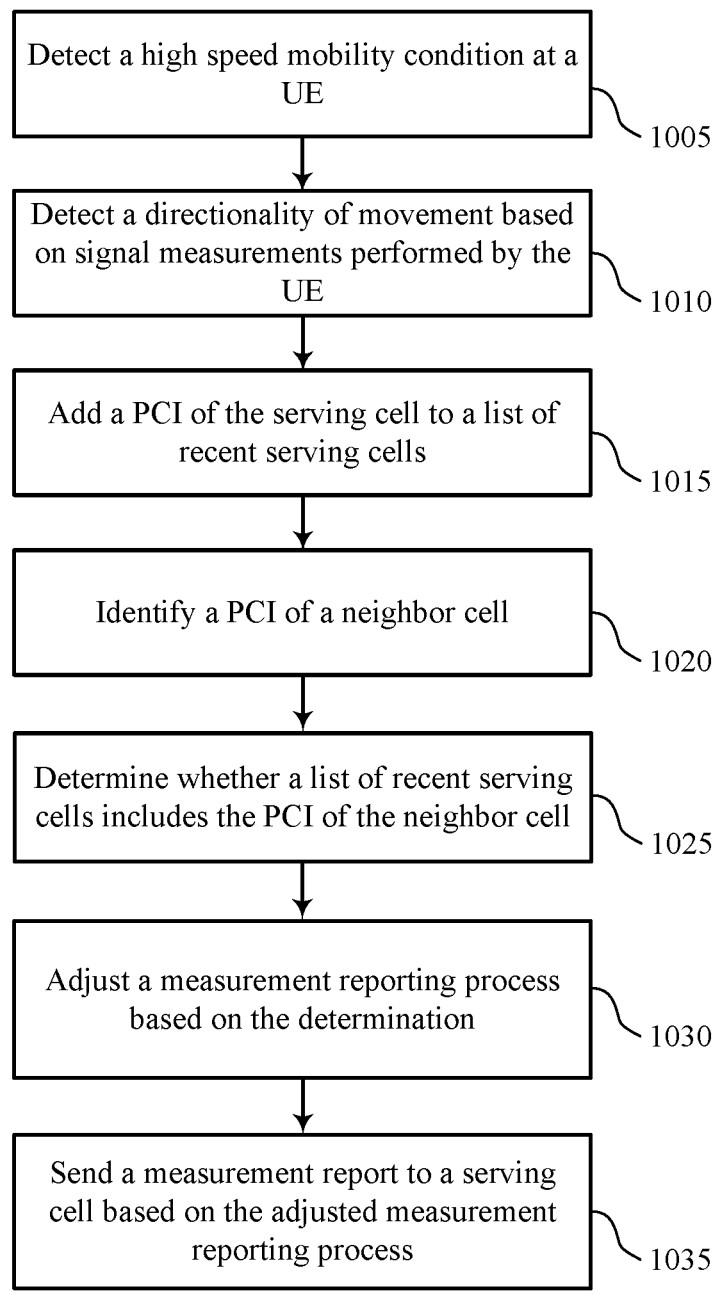

FIG. 10 shows a flowchart illustrating a method 1000 for ping-pong handover prevention in high speed networks in accordance with various aspects of the present disclosure. The operations of method 1000 may be implemented by a UE 115 or its components as described herein. For example, the operations of method 1000 may be performed by a handover manager as described with reference to FIGS. 4 through 7. In some examples, a UE 115 may execute a set of codes to control the functional elements of the device to perform the functions described below. Additionally or alternatively, the UE 115 may perform aspects the functions described below using special-purpose hardware.

At block 1005 the UE 115 may detect a high speed mobility condition at a UE. The operations of block 1005 may be performed according to the methods described with reference to FIGS. 1 through 3. In certain examples, aspects of the operations of block 1005 may be performed by a velocity determination component as described with reference to FIGS. 4 through 7.

At block 1010 the UE 115 may detect a directionality of movement based at least in part on signal measurements performed by the UE. The operations of block 1010 may be performed according to the methods described with reference to FIGS. 1 through 3. In certain examples, aspects of the operations of block 1010 may be performed by a velocity determination component as described with reference to FIGS. 4 through 7.

At block 1015 the UE 115 may add a PCI of the serving cell to a list of recent serving cells. The operations of block 1015 may be performed according to the methods described with reference to FIGS. 1 through 3. In certain examples, aspects of the operations of block 1015 may be performed by a PCI list component as described with reference to FIGS. 4 through 7.

At block 1020 the UE 115 may identify a PCI of a neighbor cell. The operations of block 1020 may be performed according to the methods described with reference to FIGS. 1 through 3. In certain examples, aspects of the operations of block 1020 may be performed by a PCI list component as described with reference to FIGS. 4 through 7.

At block 1025 the UE 115 may determine whether a list of recent serving cells includes the PCI of the neighbor cell. The operations of block 1025 may be performed according to the methods described with reference to FIGS. 1 through 3. In certain examples, aspects of the operations of block 1025 may be performed by a PCI list component as described with reference to FIGS. 4 through 7.

At block 1030 the UE 115 may adjust a measurement reporting process based at least in part on the determination at block 1025. In some cases, the measurement reporting process may be adjusted based on the high speed mobility condition and the directionality of movement. The operations of block 1030 may be performed according to the methods described with reference to FIGS. 1 through 3. In certain examples, aspects of the operations of block 1030 may be performed by a reporting process component as described with reference to FIGS. 4 through 7.

At block 1035 the UE 115 may send a measurement report to a serving cell based at least in part on the adjusted measurement reporting process. The operations of block 1035 may be performed according to the methods described with reference to FIGS. 1 through 3. In certain examples, aspects of the operations of block 1035 may be performed by a measurement reporting component as described with reference to FIGS. 4 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   detecting, at a user equipment (UE) while being served by a first cell, a high speed mobility condition associated with the first cell;
   adding, at the UE while being served by the first cell, the first cell to a list of high speed serving cells based at least in part on detecting the high speed mobility condition associated with the first cell;
   detecting, at the UE while being served by a second cell, a directionality of movement of the UE in relation to the first cell;
   performing, at the UE while being served by the second cell, at least one of adjusting a measurement report scheduling, adjusting a frequency of measurements on the first cell, or scaling a signal quality metric based at least in part on the directionality of movement and that the first cell is included on the list of high speed serving cells; and
   sending a measurement report to the second cell based at least in part on the adjusted measurement report scheduling, the adjusted frequency of measurements, or the scaled signal quality metric.

2. The method of claim 1, wherein the performing is based at least in part on an absolute signal quality of the second cell, an absolute signal quality of a neighbor cell not on the list of high speed serving cells, or a difference between a strongest recent serving cell and the neighbor cell not on the list of high speed serving cells.

3. The method of claim 1, wherein the signal quality metric comprises at least one of absolute signal strength, relative signal strength, service quality, real-time transport protocol (RTP) loss, RTP delay, or voice RTP jitter, or any combination thereof.

4. The method of claim 1, further comprising:
   performing one or more location measurements, wherein the high speed mobility condition or the directionality of movement is detected based at least in part on the one or more location measurements.

5. The method of claim 1, further comprising:
   determining a Doppler shift parameter of the first cell, wherein the high speed mobility condition or the directionality of movement is detected based at least in part on the Doppler shift parameter.

6. The method of claim 5, wherein the Doppler shift parameter comprises a magnitude of a Doppler frequency shift.

7. The method of claim 5, wherein the Doppler shift parameter comprises a magnitude of a change from a positive Doppler frequency shift to a negative Doppler frequency shift associated with passing a radio resource unit (RRU) of the first cell.

8. The method of claim 7, wherein detecting the high speed mobility condition is based at least in part on the magnitude of the change from the positive Doppler frequency shift to the negative Doppler frequency shift associated with passing the RRU of the first cell being greater than a factor of two.

9. The method of claim 5, wherein the Doppler shift parameter comprises a combination of a positive Doppler frequency shift and a negative Doppler frequency shift from different RRUs of the first cell.

10. The method of claim 1, further comprising:
    receiving an indication of the high speed mobility condition from the first cell, wherein detecting the high speed mobility condition is based at least in part on the indication.

11. The method of claim 1, further comprising:
    adding a physical cell identifier (PCI) of the first cell to the list of high speed serving cells.

12. The method of claim 1, further comprising:
    identifying a physical cell identifier (PCI) of a neighbor cell; and
    determining that the PCI of the neighbor cell corresponds to a PCI of the first cell, wherein the performing is based at least in part on the determination.

13. The method of claim 1, wherein the performing comprises:
    refraining from reporting measurements on the first cell, reducing a frequency of measurements on the first cell, or increasing a frequency of measurements on a third cell not in the list of high speed serving cells.

14. The method of claim 1, wherein detecting the high speed mobility condition is based at least in part on determining that the first cell comprises multiple radio resource units (RRUs).

15. The method of claim 1, wherein detecting the high speed mobility condition is based at least in part on determining that the first cell is part of a single frequency network (SFN).

16. The method of claim 1, wherein detecting the high speed mobility condition is based at least in part on determining that the first cell is configured to support high speed mobility.

17. The method of claim 1, wherein detecting the high speed mobility condition is based at least in part on determining that the first cell comprises a plurality of coverage areas along a linear path.

18. An apparatus for wireless communication, comprising:

means for detecting, at a user equipment (UE) while being served by a first a high speed mobility condition associated with the first cell;

means for adding, at the UE while being served by the first cell, the first cell to a list of high speed serving cells based at least in part on detecting the high speed mobility condition associated with the first cell;

means for detecting, at the UE while being served by a second cell, a directionality of movement of the UE in relation to the first cell;

means for performing, at the UE while being served by the second cell, at least one of adjusting a measurement report scheduling, means for adjusting a frequency of measurements on the first cell, or scaling a signal quality metric based at least in part on the directionality of movement and that the first cell is included on the list of high speed serving cells; and means for sending a measurement report to the second cell based at least in part on the adjusted measurement report scheduling, the adjusted frequency of measurements, or the scaled signal quality metric.

19. The apparatus of claim 18, wherein the performing is based at least in part on an absolute signal quality of the second cell, an absolute signal quality of a neighbor cell not on Flail the list of high speed serving cells, or a difference between a strongest recent serving cell and the neighbor cell not on the list of high speed serving cells.

20. A mobile device, comprising:
a processor;
memory in electronic communication with the processor; and
instructions stored in the memory and operable, when executed by the processor, to cause the mobile device to:
detect, at a user equipment (UE) while being served by a first cell, a high speed mobility condition associated with the first cell;
add, at the UE while being served by the first cell, the first cell to a list of high speed serving cells based at least in part on detecting the high speed mobility condition associated with the first cell;
detect, at the UE while being served by a second cell, a directionality of movement of the UE in relation to the first cell;
perform, at the UE while being served by the second cell, at least one of adjusting a measurement report scheduling, adjusting a frequency of measurements on the first cell, or scaling a signal quality metric based at least in part on the directionality of movement and that the first cell is included on the list of high speed serving cells; and
send a measurement report to the second cell based at least in part on the adjusted measurement report scheduling, the adjusted frequency of measurements, or the scaled signal quality metric.

21. The mobile device of claim 20, wherein the performing is based at least in part on an absolute signal quality of the second cell, an absolute signal quality of a neighbor cell not on the list of high speed serving cells, or a difference between a strongest recent serving cell and the neighbor cell not on the list of high speed serving cells.

22. The mobile device of claim 20, wherein the signal quality metric comprises at least one of absolute signal strength, relative signal strength, service quality, real-time transport protocol (RTP) loss, RTP delay, or voice RTP jitter, or any combination thereof.

23. The mobile device of claim 20, wherein the instructions are executable by the processor to cause the mobile device to:
perform one or more location measurements; and
detect the high speed mobility condition or the directionality of movement based at least in part on the one or more location measurements.

24. The mobile device of claim 20, wherein the instructions are executable by the processor to cause the mobile device to:
determine a Doppler shift parameter of the first cell; and
detect the high speed mobility condition or the directionality of movement based at least in part on the Doppler shift parameter.

25. The mobile device of claim 24, wherein the Doppler shift parameter comprises a magnitude of a Doppler frequency shift, a magnitude of a change from a positive Doppler frequency shift to a negative Doppler frequency shift associated with passing a radio resource unit (RRU) of the first cell, a combination of a positive Doppler frequency shift and a negative Doppler frequency shift from different RRUs of the first cell, or any combination thereof.

26. The mobile device of claim 20, wherein the instructions are executable by the processor to cause the mobile device to:
receive an indication of the high speed mobility condition from the first cell; and
detect the high speed mobility condition based at least in part on the indication.

27. The mobile device of claim 20, wherein the instructions are executable by the processor to cause the mobile device to:
add a physical cell identifier (PCI) of the first cell to the list of high speed serving cells.

28. The mobile device of claim 20, wherein the instructions are executable by the processor to cause the mobile device to:
identify a physical cell identifier (PCI) of a neighbor cell;
determine that the PCI of the neighbor cell corresponds to a PCI of the first cell, wherein the performing is based at least in part on the determination.

29. The mobile device of claim 20, wherein the instructions are executable by the processor to cause the mobile device to:
refrain from reporting measurements on the first cell, reduce a frequency of measurements on the first cell, or increase a frequency of measurements on at least one neighbor cell not in the list of high speed serving cells.

30. The mobile device of claim 20, wherein the instructions are executable by the processor to cause the mobile device to detect the high speed mobility condition based at least in part on determining that the first cell comprises multiple radio resource units (RRUs).

31. The mobile device of claim 20, wherein the instructions are executable by the processor to cause the mobile device to detect the high speed mobility condition based at least in part on determining that the second cell is part of a single frequency network (SFN).

32. A non-transitory computer-readable medium storing code for wireless communication, the code comprising instructions executable to:
detect, at a user equipment (UE) while being served by a first cell, a high speed mobility condition associated with the first cell;
add the first cell to a list of high speed serving cells based at least in part on detecting the high speed mobility condition associated with the first cell;

detect, at the UE while being served by a second cell, a directionality of movement of the UE in relation to the first cell;

perform, at the UE while being served by the second cell, at least one of adjusting a measurement report scheduling, adjusting a frequency of measurements on the first cell, or scaling a signal quality metric based at least in part on the directionality of movement and that the first cell is included on the list of high speed serving cells; and send a measurement report to the second cell based at least in part on the adjusted measurement report scheduling, the adjusted frequency of measurements, or the scaled signal quality metric.

* * * * *